H. I. MANLEY.
HYDRAULIC CLUTCH.
APPLICATION FILED JAN. 15, 1912.
1,043,617.
Patented Nov. 5, 1912.
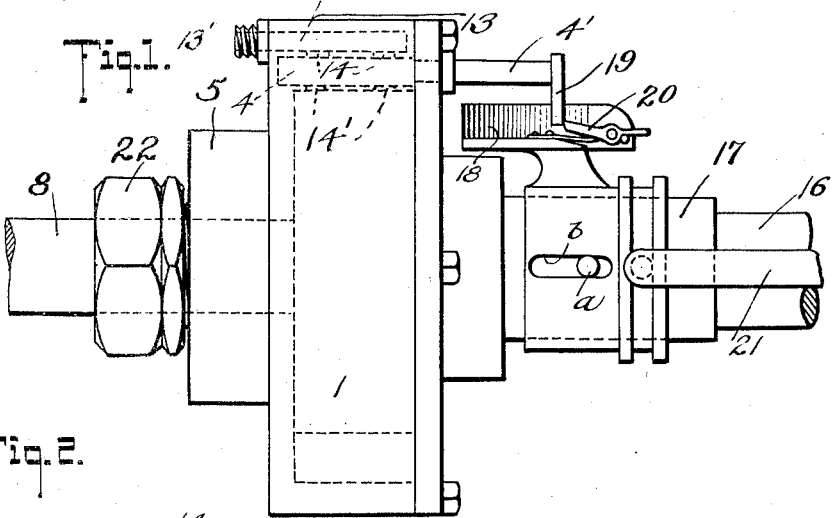
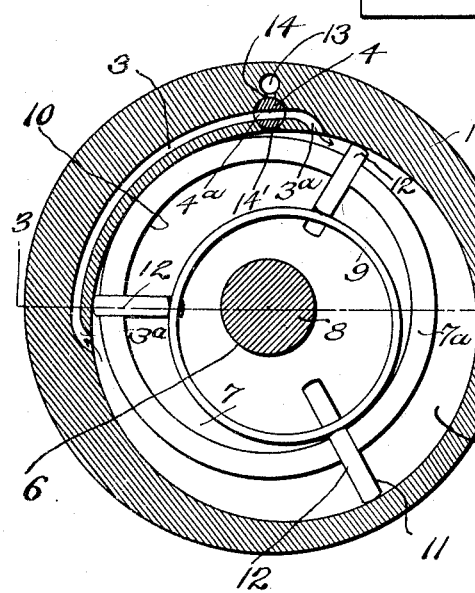
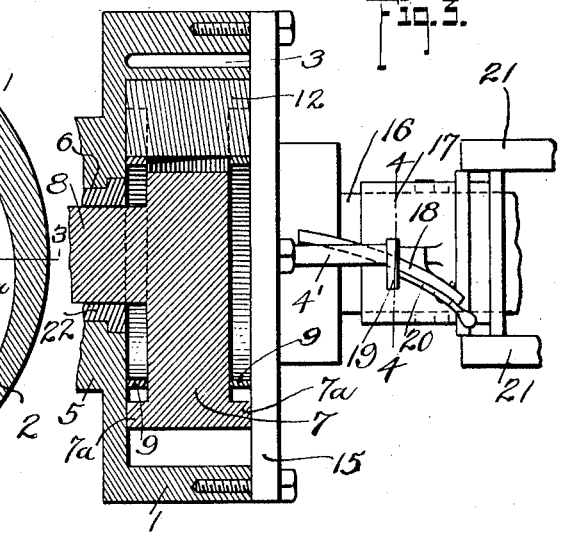
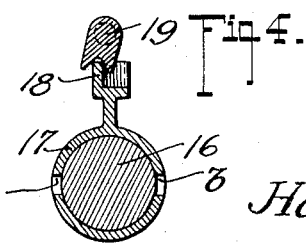
Inventor
Howard I. Manley
Witnesses

UNITED STATES PATENT OFFICE.

HOWARD I. MANLEY, OF KANSAS CITY, MISSOURI, ASSIGNOR OF ONE-HALF TO R. H. WRIGHT, OF DURHAM, NORTH CAROLINA.

HYDRAULIC CLUTCH.

1,043,617.   Specification of Letters Patent.   Patented Nov. 5, 1912.

Application filed January 15, 1912. Serial No. 671,289.

*To all whom it may concern:*

Be it known that I, HOWARD I. MANLEY, a citizen of the United States, residing at Kansas City, in the county of Jackson and State of Missouri, have invented certain new and useful Improvements in Hydraulic Clutches, of which the following is a specification.

This invention relates to hydraulic clutches, and the purpose thereof is to provide a clutch of this type which is simple and efficient in construction, and which has peculiar operating means for certain clutching blades or abutments arranged within the clutch casing.

Another object is to provide a clutch of this type which has advantageous controlling means whereby the same may be rendered operative or inoperative, and by which different speeds may be obtained. The aforesaid controlling means includes a valve that not only controls the clutching action of the device, but it is adapted to govern the replenishing of the oil, or equivalent fluid, in the clutch casing, the latter being an especial feature of novelty of the present invention.

With the above and other objects in view, this invention consists in the construction, combination and arrangement of parts, all as hereinafter more fully described, claimed and illustrated in the accompanying drawings, wherein—

Figure 1 is a front elevation of the invention applied; Fig. 2 is a sectional view taken about on the line 2—2 of Fig. 1. Fig. 3 is a top plan view of the valve controlling mechanism as associated with the casing of the clutch, the latter with interior parts being illustrated in section about on the line 3—3 of Fig. 2. Fig. 4 is a section taken about on the line 4—4 of Fig. 3, showing more clearly the manner of connecting the lever 19 with the cam 18.

Throughout the following detail description and on the several figures of the drawings, similar parts are referred to by like reference characters.

Referring to the drawings, at 1 is indicated the clutch casing constituting one clutch element and which has provided therein an oil or fluid chamber 2. Communicating with said chamber 2 is a conduit 3. The conduit 3 is formed in the outer wall of the casing, and connects with the chamber 2 at spaced points $3^a$. A valve 4 controls the passage of a fluid through the conduit 3, having an opening $4^a$ to register therewith. The casing 1 has a hub 5 and passing therethrough is a bore 6.

Mounted in the annular chamber 2 is a piston clutch element 7 which is carried on a shaft 8, the latter passing through a stuffing box 22 at the opening 6 and having a running bearing therein. The piston 7 is provided with flanges $7^a$ on its opposite ends, which flanges project a distance equal to the width of the spring rings 9 which are received in the spaces 10 formed by said flanges. The piston 7, furthermore, has provided therein radial slots 11. Mounted in said slots 11 are blades or vanes 12 which are adapted to project into the chamber 10 and the spring rings 9 are free to act upon the blades to force the same out against the wall of the annular chamber 2. As will be noted the bore 6 is concentric with the outer surface of the body 1 and eccentric with respect to the chamber 2, and the piston 7 is concentric with respect to the axis or shaft 8 and is of such a diameter that the same barely touches the wall of the chamber 2 at the point where the same is nearest thereto. Adjacent to the valve 4 is provided an opening 13 which communicates with the seat of the valve at the points 14, and with the chamber 2 at the points 14′. Said opening extends from one side of the member 1 and a nipple 13′ is provided at its outer end to connect with an oil cup or other receptacle for a purpose which will later appear.

The chamber 2 is closed by a detachable plate 15 which is secured to a shaft 16. On said shaft 16 is slidably mounted a sleeve 17 which carries a cam 18. The valve 4 has a spindle 4′ on which is mounted an arm 19, the purpose of said arm being to thereby operate the valve 4. This operation is brought about by the cam 18 engaging a notch on the arm 19, the cam with the sleeve 17 being moved on the shaft 16 to adjust the valve 4 to its desired position. A stop 20 is pivotally mounted on the cam 18 and adapted to coöperate with the arm 19 to normally limit the movement of the cam 18 in one direction. The sleeve 17 has a pin and slot connection $a$, $b$, with the shaft 16, and is operated by any means, such as a shifting fork 21.

In operation the chamber 2 is filled with any suitable fluid, such as oil, through the opening 13, the valve 4 being turned at right angles to the position illustrated in Fig. 2, to register with openings 14 and 14' thereby allowing a flow of oil from the point of supply into the chamber 2. When the chamber 2 is completely filled with oil, the opening 13 is firmly closed by any means, such as a screw cap or the like not illustrated. From the shaft 8 which is constantly running, to drive the casing clutch element 1, the power may be transmitted to the shaft 16 by turning the valve 4 so as to close the conduit 3, thereby preventing any flow of the oil in the chamber 2. Thus, it will be seen that the blades 12 operating against the fluid contents of the chamber 2 will force the element 1 to rotate, and inasmuch as the shaft 16 is carried by the member 1, said shaft will also be brought into motion. Should it be desired to rotate the shaft 16 at less speed than the shaft 8, the valve 4 may be turned so as to partly open the conduit 3, and thereby a very fine speed adjustment of the driven parts 7 and 16 may be obtained. As stated above, the control of the valve is obtained by the coöperation of the cam 18 with the arm 19, and when the valve 4 is positioned to open the conduit 3 entirely, the fluid in the chamber 2 is permitted to flow therein and through said conduit to thus unclutch the parts 1 and 7.

The normal range of movement of the valve 4 is sufficient only to open and close the conduit 3. To actuate the valve for an abnormal movement permitting its opening 4ª to register with the openings 14 and 14', as necessary in order to replenish the fluid in the chamber 2, the stop 20 is depressed so as not to engage the arm 19. The cam 18 may then receive a greater movement to impart practically a half revolution to the valve to bring it to filling position.

Having thus fully described my invention, what is claimed as new is:—

1. A hydraulic clutch comprising a casing having a fluid chamber, a rotary piston mounted eccentrically in said annular chamber, radial blades slidably mounted in the piston, said blades projecting at opposite sides of the piston, rings located at opposite sides of the piston and acting on the projecting portions of the blades, the casing having a conduit adjacent to said chamber and connecting with the same at spaced points, and means to control the size of the opening in said conduit.

2. A hydraulic clutch comprising a casing having a fluid chamber, a rotary piston mounted eccentrically in said annular chamber, radial blades slidably mounted in the piston, said blades projecting at opposite sides of the piston, resilient rings loosely fitting against opposite sides of the piston and acting on the projecting portions of the blades, the casing having a conduit adjacent to said chamber and connecting with the same at spaced points, and means to control the size of the opening in said conduit.

3. A hydraulic clutch comprising a casing having a fluid chamber, a rotary piston mounted eccentrically in said annular chamber, radial blades slidably mounted in the piston, said blades projecting at opposite sides of the piston, resilient rings loosely fitting against opposite sides of the piston and acting on the projecting portions of the blades, the casing having a conduit adjacent to said chamber and connecting with the same at spaced points, and means to control the size of the opening in said conduit, the piston having annular flanges projecting from opposite sides and forming spaces in which the said rings are located.

4. A hydraulic clutch comprising a drive shaft, a casing clutch element thereon having an eccentric inner fluid chamber a fluid supply passage, and a conduit communicating with said chamber at spaced points, a piston clutch element rotatably mounted in said fluid chamber concentric with the drive shaft, blades mounted on the piston, means coöperating with the blades to cause same to act against the fluid in said chamber, a valve in the conduit and normally closing the fluid supply passage, means normally actuating the valve to control the opening and closing of the conduit, and means normally preventing movement of the valve to open the fluid supply passage.

5. A hydraulic clutch comprising a casing having a supply passage, a fluid chamber, and a conduit communicating with said chamber at spaced points, a piston rotatably mounted in said annular chamber, said piston having mounted therein blades, and a valve adapted to control the said conduit and to open and close said supply passage.

6. A hydraulic clutch comprising a casing having liquid supply passage, an annular liquid chamber, and a conduit communicating with said annular chamber at spaced points, a piston rotatably mounted in said chamber, said piston having sliding blades thereon, a valve located in said conduit and normally closing said passage, means whereby said valve may be operated to regulate the size of the opening in the conduit and to open the supply passage, and means normally preventing movement of the valve to open the liquid passage.

7. A hydraulic clutch comprising a drive shaft, a casing clutch element thereon having an eccentric inner fluid chamber a fluid supply passage, and a conduit communicating with said chamber at spaced points, a piston clutch element rotatably mounted in said fluid chamber concentric with the drive shaft, blades mounted on the piston, means coöperating with the blades to cause same to act against the fluid in said chamber, a valve at the conduit and normally closing the fluid supply passage, a cam for imparting movement to the valve to open and close the conduit and fluid supply passage, and a member normally preventing movement of the valve to open said passage.

In testimony whereof I affix my signature in presence of two witnesses.

HOWARD I. MANLEY.

Witnesses:
FRANK C. COLEWOOD,
M. W. ROSEBROUGH.